3,475,461
OXIDATION OF OLEFINIC COMPOUNDS
William Gilbert Lloyd, Randolph Township, Morris County, N.J., assignor to The Lummus Company, New York, N.Y., a corporation of Delaware
No Drawing. Continuation-in-part of application Ser. No. 391,005, Aug. 20, 1964, which is a continuation-in-part of applications Ser. No. 474,460, Ser. No. 474,461, and Ser. No. 474,506, all July 23, 1965. This application Jan. 3, 1966, Ser. No. 517,981
Int. Cl. C07d 5/16; C07c 69/54, 43/00
U.S. Cl. 260—347.8                12 Claims

ABSTRACT OF THE DISCLOSURE

Process for producing an oxygen containing derivative of an olefinic compound by reacting the olefinic compound with an alcohol in the presence of noble metal compound catalyst, oxygen and a redox promoter wherein the reaction is effected in the presence of an inhibiting amount of either a monocyclic aromatic hydrocarbon having one hydroxy group substituted on the aromatic nucleus, a halo-substituted phenol, a monocyclic hydrocarbon having at least two hydroxy groups substituted on the aromatic nucleus, a lower alkoxy phenol, benzyloxy phenol, a quinone and the alkyl and halo substituted derivatives thereof, digallic acid, ascorbic acid or triphenyl amine.

---

This application is a continuation-in-part of my application Serial Number 391,005, filed August 20, 1964, and of my applications filed July 23, 1965, namely, Serial Numbers 474,460, 474,461 and 474,506, all now abandoned. The latter are continuation-in-part applications of Serial Number 391,005.

This invention is directed to a novel process for forming acetals, ketals, esters and ortho-esters, their hydrolysis reaction products, and to novel products obtained therewith.

Broadly, as described in parent application Serial No. 391,005, an acetal, ketal or ortho-ester is formed by reacting certain unsaturated compounds with a primary or secondary, mono- or poly-hydric alcohol, in the substantial absence of water and in the presence of a catalytic amount of a compound of a noble metal of Group VIII of Mendeleeff's Periodic Table. The acetal, ketal or ortho-ester so formed can be readily hydrolyzed to a corresponding aldehyde, ketone or ester, respectively. In the preparation of the desired acetal, ketal or ortho-ester, the yield is often less than satisfactory due to the occurrence of side reactions and production of other products.

Similarly, in the three parent applications filed July 23, 1965, it has been found that while desired products are formed, yields thereof suffer by virtue of side reactions and formation of other products.

It has now been found that increased yields of desired products are obtained, with side reactions being suppressed, by including within the reaction of the unsaturated compound with the alcohol, certain additives which serve as inhibitors.

It is an object of the present invention, therefore, to provide an efficient process for the production of an acetal, ketal or ortho-ester. Another object is to provide for increased yields of desired products in said process. A further object is to suppress side reactions in said process. Additional objects will become apparent from the following description.

In accordance with the present invention an inhibitor is included within the reaction system identified above. The inhibitor serves to suppress side reactions particularly at relatively high reaction temperatures, thus making possible increased yields of desired products.

Additives effective in inhibiting side reactions include the following:

A monohydric aromatic hydrocarbon:phenol; alkylated phenols such as p-cresol, p-octylphenol and 2,6-di-tertiary-butyl-4-methylphenol; and halogenated phenols such as 2,4,6-tribromophenol;

An etherphenol such as p-methoxyphenol and p-benzyl-oxyphenol;

A polyhydric aromatic hydrocarbon such as hydroquinone, catechol nordihydroquaiaretic acid and pyrogallol, and alkylated and halogenated derivatives thereof such as tetrafluorohydroquinone;

A quinone and its alkylated and halogenated derivatives such as quinone, 1,4-naphthoquinone and chloroanil;

A phenolic and an alcoholic acid such as digallic acid and ascorbic acid; and

A triaryl amine such as triphenylamine.

It is to be understood that all of such additives are effective in the reaction systems contemplated herein, although all are not of equivalent effectiveness as shown in the illustrative examples.

Concentration of additive used is at least about 40 percent by weight based upon the weight of catalyst used. Preferably, the additive concentration is from about 2 to about 10 times the weight of the catalyst. The weight of catalyst is taken as a base and is the weight of noble metal compound and promoter (such as cupric chloride).

The unsaturated compounds used herein are represented by the general formula

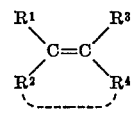

wherein $R^1$, $R^2$, $R^3$ and $R^4$ are selected from hydrogen, alkyl, alkenyl, cycloalkyl, alkaryl, aralkyl, aryl, haloalkyl, haloaryl, halocycloalkyl, halogen, cyano, ester such as $COOR^5$ wherein $R^5$ is a hydrocarbon radical, acyl, acyloxy (e.g. acetoxy), alkoxy, aroxy, aralkoxy, alkaroxy, cycloalkoxy, and $R^6X$ wherein $R^6$ is a hydrocarbon group to which is attached a group selected from nitro, carboxyl and hydroxyl. However, when $R^1$ is phenyl, $R^2$ is other than phenyl and methyl. Also unsaturated halogen compounds should have no more than two halogen groups. At least one of $R^1$–$R^4$ should be hydrogen.

Typical of the unsaturated compounds include:

Olefins—ethylene, propylene, 1-butene, isobutylene, styrene, cyclohexane, cyclopentene,
Halogens—monochloroethylene, dichloroethylene,
Nitriles—acrylonitrile, crotononitrile,
Nitro compounds—p-nitrostyrene,
Carboxylic acids—crotonic acid,
Hydroxyl compounds—1,1-dimethylolethylene, cyclopentenediol-3,4,4,4-dimethylolcyclohexene,
Esters—vinyl acetate, ethyl acrylate, methyl methacrylate,
Ethers—vinyl ethyl ether.

It is to be understood that a mixture of two or more unsaturated compounds can be used herein.

Reacting with the unsaturated compound, or a mixture thereof, is a primary or secondary, mono- or poly-hydric alcohol, or mixture thereof. A variety of such alcohols are available and the nature of the alcohol used influences the type of product obtained. Representative alcohols include:

Monohydric—methyl, ethyl, propyl, butyl, secondary butyl, isobutyl, tertiary butyl, pentyl, hexyl, benzyl alcohol, ethylene chlorohydrin, Vicinal diols—ethylene glycol, propylene glycol, 2,3-butylene glycol Homovicinal diols—propanediol-1,3
Non-vicinal diols—hexanediol-1,6
Other polyols—glycerine, pentaerythritol, sorbitol, sucrose, mannitol, 1,4-dihydroxymethylbenzene, 2-methyl-2,4-pentanediol, 1,1-dimethylol ethylene, 1,4-cyclohexane dimethanol, 2,2,4,4-tetramethylcyclobutane-1,3-diol, 2,2-propylidene bis(4-benzyl alcohol), namely

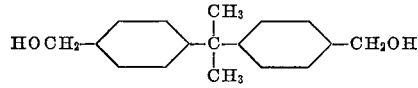

It is to be understood that a single compound having both the requisite unsaturated and specified hydroxy grouping can be used herein, rather than individual unsaturated compound and alcohol. Illustrative of such compounds are 1,1-dimethylol ethylene; cyclopentenediol-3,4; and 4,4-dimethylolcyclohexene.

Generally, at least about two molar proportions of an alcohol are used for each molar proportion of unsaturated compound. Preferably, from 3 to 10 proportions of alcohol are used.

In the catalyst systems used herein, a compound of a noble metal of Group VIII of Mendeleeff's Periodic Table is used in catalytic amount. Typical of such metals are: palladium, iridium, ruthenium, rhodium, platinum and osmium. The metals are used in the form of a metal compound. Anions associated with the metals can be of a wide variety, with halides being preferred. Catalytic amounts of metal compound will generally be from about 0.001 to about 0.04 molar proportion, based upon the unsaturated compound. Economic considerations mitigate against the use of large quantities of metal compound.

The noble metal compound is preferably used with a promoter having an oxidation potential sufficient to change the valence of the noble metal from a lower to a higher valence state. Representative and preferred of such promoters is cupric chloride. Others include such redox systems as compounds of metals having various oxidation stages, namely: compounds of copper, silver, tin, lead, cerium, mercury, nickel and iron. Anions associated with the metals can be of wide variety, including nitrates and acetates, with preference being accorded to halides and, particularly, to chlorides. Representative of such promoters are: cupric chloride, bromide, fluoride, acetate, citrate, acetylacetonate, benzoate, ferrocyanide, and nitrate; cuprous iodide, thiocyanate and cyanide; ferric and ferrous chlorides; mercuric chloride; cobaltous chloride; and silver acetate. The molar ratio of promoter to noble metal compound is from about 0.1:1 to about 100:1.

Vicinal diketones are particularly advantageous promoters, as shown in applications Ser. No. 474,460 and 474,506 mentioned above. Typical of such diketones are: 1,2-butanedione; 2,3-butanedione (diacetyl); 3,4-hexanedione; and 1,2-diphenylethanedione (benzil).

Thus, diketone promoters include vicinal diketones and diketones in which the keto groups are separated by a

group.

Compounds capable of oxidation to vicinal diketones are also useful as promoters. Such compounds are illustrated by: acetoin (which is oxidized to diacetyl) and benzoin (which is oxidized to benzil).

Particularly preferred promoters are benzil and chloranil.

Concentration of vicinal diketone or its precursor ranges from about 1:1 to about 100:1, based upon the noble metal compound.

Iodine is also useful as a promoter.

Oxygen can also be considered a promoter in the reaction, wherein it can be used with a noble metal compound and with or without one or more of the other promoters mentioned above. As will be readily appreciated, the molar ratio of unsaturated compound to oxygen is preferably adjusted to avoid explosion. The ratio is of the order of about 0.2:1 to 4:1; however, ratios of 0.3:1 to 1:1 are preferred. Oxygen pressure is generally from atmospheric to about 250 pounds per square inch gauge (p.s.i.g.).

Although not essential, it is generally desirable to include in the catalyst system a small amount of an acid, such as halogen acid. The acid serves to solubilize the noble metal compound in the alcohol. Hydrochloric acid can be used with palladous chloride and cupric chloride.

Cosolvents can be used with an alcohol. Suitable cosolvents are: dimethylformamide, perchloroethylene, chlorobenzene, dioxane, acetonitrile, dialkyl ethers, esters of carboxylic acids, benzene and other aromatic hydrocarbons.

The following examples are illustrative of the invention. However, it is to be understood that the invention is not to be construed as limited to the particular materials and conditions recited therein.

EXAMPLE 1

Parallel-paid oxidations of olefins in alcohols, were made with or without a phenolic antioxidant added to the reaction charge. In this series, palladium catalyst was in the form of 0.355 gram of palladous chloride. Cupric chloride was used in a concentration of 0.855 gram of $CuCl_2 \cdot 2H_2O$. To a 500 ml. capacity, heavy-wall Pyrex glass reactor was added, the desired amount of catalyst, promoter, 40 ml. of an alcohol, 10 ml. of unsaturated compound, and 2 grams of 2,6-ditertiary-butyl-p-cresol. The reactor was closed and sealed. The reactor was purged by pressuring it three times to 30 p.s.i.g. oxygen, then venting. The reactor was then pressured to 30 p.s.i.g. oxygen, agitation was commenced and heating was started. Warmup was accomplished in less than 15 minutes for any temperature to 100° C. The oxidation was then carried out isothermally, for two hours. After cooling, the reactor was vented and each reaction mixture was collected for analysis.

Oxygen pressure drop during a run provides an indication of the extent of reaction. The greater the pressure drop, the greater reaction.

Results of the series of tests is given below in Table I.

TABLE 1

| Unsaturated Compound | Alcohol | Pressure Drop, p.s.i. No Inhibitor | Inhibitor |
|---|---|---|---|
| Octene-1 | Ethylene Glycol | 75 | 60 |
| Styrene | do | 120 | 90 |
| Acrylonitrile | Propylene Glycol | 100 | 30 |
| Ethyl Acrylate | Ethyl | 60 | Nil |

It is to be noted from the data set forth in Table I that is substantial difference in pressure drop is shown for the reactions involving: styrene, acrylonitrile and ethyl acrylate. In each instance, the olefin is relatively slow to react in the catalytic reaction system but is susceptible to autooxidation. The inhibitor materially reduces the rate and extent of oxygen uptake.

EXAMPLE 2

Ten ml. of styrene and 40 ml. of ethyl alcohol were charged to a glass shaker-reactor along with palladous chloride and cupric chloride to yield 0.0281 and 0.1171 mole/liter, respectively, the mixture warmed to 30° C. and shaken at that temperature under 3 atmospheres of oxygen for 120 minutes, then cooled and the contents analyzed by quantitative gas chromatography. The styrene conversion was found to be 90% and the yield of normal carbonyl products, determined after acid hydrolysis of the acetal, was 59% as phenylacetaldehyde and acetophenone. Forty-one percent of the reacted styrene was found to have been converted to side-products, of which the principal component was benzaldehyde. In a parallel run the same reagents and salts were charged, along with 0.5 g. (0.091 mole/liter hydroquinone, and the mixture subjected to identical oxidation conditions, whereupon the styrene conversion was found to be 80% and the yield of normal carbonyl products increased from 59% to 74%, while the combined yield of side products was decreased from 41% to 26%.

EXAMPLE 3

Under normal oxidation conditions in substantially anhydrous alcohol, the primary oxidation product, an acetal, is subject to a secondary oxidation reaction to yield the corresponding ester. Thus 50 ml. of a mixture of acetal and ethyl alcohol (prepared by combining 20% acetaldehyde and 80% ethyl alcohol by volume) was charged to a glass shaker-reactor along with palladous chloride and cupric nitrate to yield 0.02 and 0.1 mole/liter, respectively, and the mixture warmed to 90° C. and shaken at that temperature under 3 atmospheres of oxygen for 120 minutes, then cooled and the contents analyzed by quantitative gas chromatography. It was found that 21.4% (molar basis) of the acetal had been further oxidized to ethyl acetate. In a parallel experiment, using another aliquot of the same acetal-ethyl alcohol mixture and the same amounts of palladous chloride and cupric nitrate but with the addition of 0.1 mole hydroquinone per liter, and heating under the same conditions, it was found that only 10.6% (molar basis) of the acetal had been further oxidized to ethyl acetate, a reduction of the side product to less than half that found in the control run.

EXAMPLE 4

Twenty-five ml. each of 2,5-dihydrofuran and isopropyl alcohol were charged to a glass shaker-reactor along with cupric chloride and palladous chloride to yield 0.1 and 0.02 mole/liter, respectively, the mixture warmed to 50° C. and shaken at that temperature under 3 atmospheres of oxygen for 120 minutes, then cooled and the contents analyzed by quantitative gas chromatography. The conversion of dihydrofuran was 21% and the yield of oxygenated tetrahydrofuran was 84%. In a parallel run with all conditions identical except for the addition of 0.5 g. (90.0805 mole/liter) of p-methoxyphenol, the conversion of dihydrofuran was again 21% but the yield of oxygenated tetrahydrofuran was increased from 84% to 89% and the yield of side product was reduced from 16% to 11%.

EXAMPLE 5

Twenty-five ml. each of 1-octene and methyl alcohol were charged to a glass shaker-reactor along with 1 mg.-mole palladous chloride and 5 mg.-mole cupric chloride dihydrate, the mixture warmed to 50° C., and shaken at that temperature under 3 atmospheres of oxygen for 120 minutes, then cooled and the contents analyzed by gas chromatography. A parallel oxidation was also made, identical in all respects to the above except for the addition of 1.00% (v./v.) of p-cresol to the reaction mixture just prior to the oxidation. The results found are as follows:

| p-Cresol present | Conversion of octene, percent | Yield of 2-octanone, percent | Yield of side product, percent |
|---|---|---|---|
| None | 49.6 | 96.8 | 3.16 |
| 1.00% (v./v.) | 81.4 | 98.5 | 1.48 |

Thus, the oxidation carried out with p-cresol present not only afforded a higher yield of 2-octanone, the side product being reduced to less than half that found in the absence of the cresol, but also and surprisingly effected a marked improvement in the conversion of octene to octanone.

EXAMPLE 6

A series of runs were made to determine the effectiveness of a variety of additives as inhibitors. Results are provided in Table II, below, in which effective inhibitors are shown together with compounds which are ineffective or, in fact, deleterious.

This series of runs was made with 50-ml. aliquots of a 20-80 (by volume) mixture of cyclohexene and tertiary butyl alcohol, in a low-pressure shaker-reactor. Reaction was conducted with 50 ml. of mixture, 0.178 g. (1 mg.-mole) palladous chloride, 0.853 g. (5. mg.-moles) cupric chloride dihydrate and 5 mg.-moles of the additive. The reaction charge was shaken together for 120 minutes at 80° C. under 3 atmospheres of oxygen.

TABLE II

| G./100 ml. | Additive | Percent Yield Cyclohexanone |
|---|---|---|
| None | None | 23 |
| 3.22 | Digallic acid | 49 |
| 1.76 | Ascorbic acid | 45 |
| 2.06 | p-Octylphenol | 39 |
| 0.94 | Phenol | 45 |
| 3.02 | Nordihydroguaiaretic acid | 49 |
| 1.82 | Tetrafluorohydroquinone | 39 |
| 3.32 | 2,4,6-tribromophenol | 46 |
| 2.20 | 2,6-di-tert-butyl-4-methylphenol | 28 |
| 1.74 | Polymerized trimethyldihydroquinoline [1] | Nil |
| 2.46 | Chloranil | 40 |
| 1.58 | 1,4-naphthoquinone | 46 |

[1] This compound is a commercial, nitrogen-containing, antioxidant marketed by R. T. Vanderbilt Co. as "Age Rite Resin D."

As revealed by the results tabulated in Table II, a phenolic acid such as digallic acid is effective as is an alcoholic acid such as ascorbic acid (which can also be considered an enol). Phenol and a number of substituted phenols are also shown to be effective. Large amounts of quinones, namely, chloranil and 1,4-naphthoquinone, are effective in improving yield of cyclohexanone, although conversion of cyclohexene is not improved. As shown, a commercial antioxidant, a polymerized trimethyldihydroquinoline, is not only ineffective as an additive but is actually deleterious.

While 2,6-di-tertiarybutyl-4-methylphenol is of less effectiveness than the other illustrative phenols, it is to be noted that the same additive is much more effective in the reaction systems shown in Table I, above. Comparison of the results obtained with 2,6-di-tertiarybutyl-4-methylphenol, as shown in Tables I and II, indicates that this additive is more effective with an olefin having an electron withdrawing substituent such as a cyano (CN), ester, phenyl or alkyl group.

EXAMPLE 7

In this example, a number of nitrogenous compounds are shown. While a triarylamine-triphenylamine is shown to be effective as an additive by a marked improvement in yield of cyclohexanone, with a lesser conversion of olefin charge, cyclohexene, amines of other character and other nitrogenous compounds are either ineffective in substantially reducing conversion three-fold or greater, or suppress reaction completely.

A series of runs was made with 40 ml. of ethanol and 10 ml. of cyclohexene, together with 1 g. of additive, 0.25 g. palladous chloride and 1 g. cupric chloride dihydrate. A reaction charge of such materials was shaken together for 120 minutes at 50° C. under 3 atmospheres of oxygen, in a low-pressure, shaker-reactor.

Results are given in Table III, below.

TABLE III

| Additive | Percent Conversion of Cyclohexene | Percent Yield of Cyclohexanone |
|---|---|---|
| None | 76 | 57 |
| Triphenylamine | 50 | 82 |
| N-methyldiphenylamine | 25 | 88 |
| Diphenylamine | 16 | 67 |
| Tribenzylamine | 12 | 90 |
| Tri-n-butylamine | 8.6 | 99+ |
| Pyridine [a] | | Nil |
| 2-picoline [a] | | Nil |
| 2,6-lutidine [a] | | Nil |
| 2,4,6-collidine [a] | | Nil |

[a] These are liquids; accordingly 1-ml. portions were used, rather than 1-gram portions.

Reaction conditions influencing the formation of the products, include: temperature, olefin concentration, concentration of noble metal compound, concentration of promoter, oxygen pressure, acidity and amount of water added. Such conditions are illustrated in detail in the aforementioned parent applications, to which reference is made.

The compounds formed in accordance with this invention are useful as indicated above. For example, relatively low molecular weight, polyhydric polymeric materials can be used as the polyol component or components in the formation of polyisocyanate or polyester resins. Dioxolanes can be used as solvents and as high boiling heat transfer media. The materials described herein, as will be readily appreciated by those skilled in the art, can be used as chemical intermediates. By way of illustration, the nitriles so formed can be converted by conventional methods to the corresponding amines or carboxylic acids.

It is to be understood that many modifications may be made within the scope of the present invention without departing from the spirit thereof.

I claim:

1. In the reaction between a hydrocarbon alcohol having hydroxy groups substituted on non-aromatic carbon atoms and a member selected from the group consisting of olefinically unsaturated hydrocarbons, acrylonitrile, crotononitrile, ethyl acrylate, methyl methacrylate, 2,5-dihydrofuran and p-nitro styrene, in the presence of a catalytic amount of a noble metal compound of Group VIII of Mendeleef's Periodic Table, oxygen and a redox promoter, the improvement comprising: effecting the reaction in the presence of an inhibitor, said inhibitor being present in an amount which is at least about 40 percent by weight of the concentration of the noble metal compound and being selected from the group consisting of mono-di, tri- and tetra hydroxy benzene and their alkyl and halo-substituted derivatives, lower alkoxy phenol, benzyloxy phenol, quinone, 1,4-naphthoquinone, chloranil, digallic acid, ascorbic acid and triphenyl amine.

2. The process defined by claim 1 wherein the inhibitor is a mono-hydroxy benzene and is selected from the group consisting of phenol, -cresol, -octylphenol, and 2,6-tertiarybutyl-4-methylphenol.

3. The process defined by claim 1 wherein the inhibitor is selected from the group consisting of hydroquinone, catechol, pyrogallol, and nordihydroquaiaretic acid.

4. The process defined by claim 1 wherein the inhibitor is quinone.

5. The process defined by claim 1 wherein the inhibitor is 2,4,6-tribromophenol.

6. The process defined by claim 1 wherein the inhibitor is tetrafluorohydroquinone.

7. The process defined by claim 1 wherein the inhibitor is $\varphi$-methoxyphenol.

8. The process defined by claim 1 wherein the inhibitor is $\varphi$-benzyloxyphenol.

9. The process defined by claim 1 wherein the inhibitor is chloranil.

10. The process defined by claim 1 wherein the inhibitor is digallic acid.

11. The process defined by claim 1 wherein the inhibitor is ascorbic acid.

12. The process as defined in claim 1 wherein the olefinic compound is cyclohexene.

References Cited

UNITED STATES PATENTS 3,285,970  11/1966  Schaeffer.

FOREIGN PATENTS 628,848  6/1963  Belgium.

ALEX MAZEL, Primary Examiner

BERNARD I. DENTZ, Assistant Examiner

U.S. Cl. X.R.

260—465.6, 468, 484, 586, 592, 597, 599, 615, 687

UNITED STATES PATENT OFFICE
CERTIFICATE OF CORRECTION

Patent No. 3,475,461

October 28, 1969

William Gilbert Lloyd

It is certified that error appears in the above identified patent and that said Letters Patent are hereby corrected as shown below:

Column 4, line 20, "paid" should read -- pair --; line 74, after "liter" insert a closing parenthesis.

Signed and sealed this 3rd day of March 1970.

(SEAL)
Attest:

Edward M. Fletcher, Jr.
Attesting Officer

WILLIAM E. SCHUYLER, JR.
Commissioner of Patents